Dec. 30, 1930.   F. R. DIPPMAN ET AL   1,786,719
CURRENT COLLECTOR SUPPORT
Filed July 24, 1929

Witness:
H. J. Stromberger

Inventor
EDGAR D. MOORE
FRED R. DIPPMAN
By
Attorney

Patented Dec. 30, 1930

1,786,719

UNITED STATES PATENT OFFICE

FRED R. DIPPMAN AND EDGAR D. MOORE, OF MANSFIELD, OHIO, ASSIGNORS TO THE OHIO BRASS COMPANY, OF MANSFIELD, OHIO, A CORPORATION OF NEW JERSEY

CURRENT-COLLECTOR SUPPORT

Application filed July 24, 1929. Serial No. 380,732.

Our invention relates to a device for use in connection with current collectors and trolley poles for connecting the current collector to the pole and has for this major objects, preventing sound vibrations passing from the current collector as it moves along the trolley wire to the trolley pole and thence to the car roof, and also giving a certain amount of resiliency in the connection between the current collector and pole in order to maintain a better and more continuous contact of the current collector with the trolley wire.

Our invention resides in the new and novel construction, combination and relation of the various parts herein described and shown in the drawing forming a part of this specification.

In the drawing:—

Figure 1:
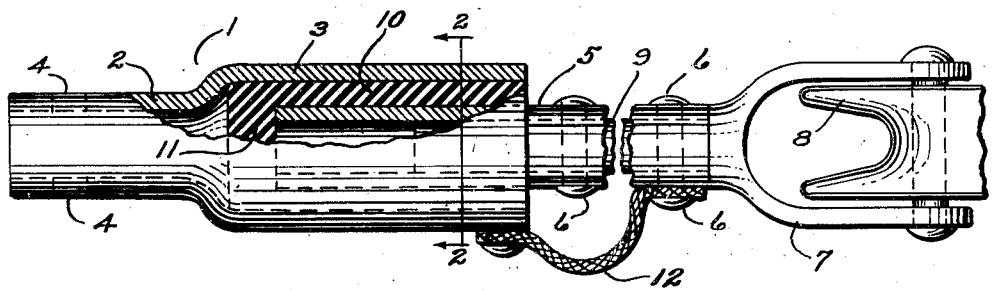
Fig. 1 is a top plan view of our invention in partial section.

Our invention in its preferred embodiment comprises an outer member 1 having a tubular end portion 2 and an enlarged tubular end portion 3. The portion 2 receives the end of a trolley pole and may be secured thereto by means of a rivet extending through the pole and the oppositely disposed holes 4 in the part 2. The portion 2 can be made of such a size that it will slip within the end of the trolley pole if desired, in which case the part 2 may be made solid if desired.

Figure 2:
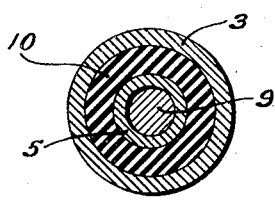
Fig. 2 is a section on the line 2—2 of Fig. 1.

Inserted within the hollow of the portion 2 is a tubular member 5 projecting beyond the portion 3 and is provided with oppositely disposed holes through which pass the rivets 6 for connecting to the part 5 a support 7 for the current collector 8. The support 7 has a projecting stem 9 (see Fig. 2) which extends into the tubular portion 5 and is held in place by the rivets 6.

Interposed between the portion 3 of the member 1 and the tubular member 5 is a resilient member 10 which is made preferably of rubber. We prefer to use rubber as against other yielding or resilient materials as it seems to be superior in many respects for our purpose. The member 10 may be of varying degrees of resiliency, depending upon the amount of yield or spring action which is desired between the parts 1 and 5. Hard rubber, however, is not suitable as it lacks spring and does not destroy or dampen the sound vibrations. A grade of rubber known as car spring rubber we find to be quite suitable for our purpose, also such grades as are used in the manufacture of the tread on rubber tires.

It will be noted that there is no engagement between the parts 1 and 5 as we find that such contacting would permit sound vibrations to pass from the member 5 to the member 1. We also find that it is preferable to unite the member 10 to the parts 1 and 5 in such a manner that the member 10 will hold the parts in a predetermined relative relation and also prevent their separation, in other words, making the three members 1, 5 and 10 a unit.

The union of the rubber to the metal, which might be termed a vulcanized union due to the fact that the union is made during the vulcanization of the member 10, or it might be called a surface union due to the fact that there is a strong adhesion of the rubber to the metal parts, which prevents the withdrawal of the parts in a longitudinal direction or the rotation of the metal parts relative to the rubber. The parts 1 and 5, however, with a sufficiently resilient member 10 may pivot as it were relative to each other about the longitudinal axis of the device, but this is due to the yielding of the rubber and not to a slippage between the rubber and the metal parts.

There are several methods of securing the rubber to the metal parts known to those skilled in the rubber art and one method is to place upon the surface of the metal parts a coating of rubber and then to insert the parts in a mold with the rubber compound forming the member 10 in position and subjecting the parts to a vulcanizing temperature. Another method is to coat the surfaces of the metal parts with a specially prepared rubber cement having the property of adhering to metal and then placing the parts in a mold with the rubber composition in place and subjecting to vulcanizing conditions. Further, the parts may be united to the rubber by the same method as ringer rollers to the ringer axle.

The member 10 is shown as formed along the lines of a cup having a side wall and an end wall and the end of the member 5 abuts against the end wall 11 and is prevented from pushing through into contact with the member 1, if there is sufficient tendency for this to take place.

In order to electrically connect the parts 1 and 5 without destroying the silencing feature of the device, I secure to the member 1 a shunt 12 composed of braided copper made of very fine wires, which does not conduct sound. The shunt 12 may be welded or brazed to the member 3 and secured to the member 5 by means of one of the rivets 6.

Another method of connecting the parts 5 and 1 would be to place the shunt as an internal element and passing through an orifice in the end portion 11 of the member 10 and securing the ends of the shunt to the parts 5 and 1 interior thereof.

It will be seen that we have provided a device for connecting the current collector and its support to a trolley pole comprising three parts, two of which are of metal held out of contact with each other and in a predetermined relation and against separation by means of interposed rubber alone. The rubber performs several functions, namely it insulates the parts 1 and 5 electrically, it prevents the transmission of sound vibrations from the member 5 to the member 1, it holds the parts 1 and 5 in a separated and predetermined relation and it prevents the separation of the parts 1 and 5, but it permits a relative yielding movement of the parts 1 and 5 under stress.

In our co-pending applications, Serial No. 344,984, filed March 7, 1929, and Serial No. 369,553, filed June 10, 1929, we have shown a similar device in which both metal parts were not held in fixed relation and against separation through a vulcanized union of each of the metal parts to the rubber member, thereby requiring separate means for preventing the separation of the parts.

If desired, the member 5 may be made solid in place of tubular and the portion 9 of the collector support made tubular to receive the end of the member 5 and held in place by the rivets 6. Also, the members 5 and 9 may be cast or formed integral such that the support for the current collector would form a part of the unit device.

Having described our invention, we claim:—

1. A trolley device comprising a pair of metal parts held out of contact and prevented from separation by a resilient rubber member vulcanized to the surfaces of the metal parts.

2. A trolley device comprising a pair of tubular metal parts held out of contact and prevented from separation by a yielding non-metallic member secured to the parts by a surface union with the parts, and means to secure one part to a trolley support and the other part to a current collector.

3. A trolley device comprising a pair of elongated metal parts having a common longitudinal axis and one part overlapping a portion of the other part and a resilient member interposed between the surfaces by a vulcanized union to insulate the parts electrically and acoustically from each other and maintain them out of engagement and prevent their separation, and means to secure thereto a support for the device and a current collector.

4. A trolley pole attachment comprising a pair of members held in spaced relation and against separation by a resilient member secured to the parts by a surface union; one part having two portions and one portion being tubular to receive a portion of the other part in spaced relation, the said other part having a portion to receive a support for a current collector and the resilient member holding the parts in spaced relation and preventing separation of the parts, but permitting a relative yielding movement of the parts, also preventing sound vibrations passing from one part to the other and electrically insulating the parts.

5. A trolley device comprising a pair of metal parts held out of contact and prevented from separation by a resilient rubber member vulcanized to the surfaces of the metal parts and a flexible shunt member secured to the parts to electrically connect the parts.

6. A trolley device comprising a pair of metal parts held out of contact and prevented from separation by a resilient rubber member vulcanized to the surfaces of the metal parts and means electrically connecting the parts.

7. A trolley device comprising in combination, a current collector, means for securing the collector to a pole comprising a part to be attached to the pole, a cooperative part to be attached to the collector and a member of resilient material between the parts and secured to the parts by a vulcanized surface union to secure the parts together against separation and maintain them electrically separated and yieldingly resist relative movement of the parts.

8. A trolley device part comprising a body having an enlarged tubular portion, a body of resilient material within the tubular portion and secured to the surface thereof by a surface union preventing slippage of the parts relative to each other.

9. A trolley device part comprising a body having an enlarged tubular portion, a member of resilient rubber within the tubular portion and having a vulcanized union with the inner surface thereof to prevent relative surface movement and an orifice in the resilient member to receive another part to support a current collector.

10. A trolley device to support a current collector comprising a pair of spaced metallic members, a resilient rubber member interposed between the parts and secured to the parts by a surface union preventing slippage between the rubber and each of the parts and preventing separation of the parts.

11. A trolley device to support a current collector comprising a pair of spaced metallic members, a resilient rubber member interposed between the parts and secured to the parts by a surface union preventing slippage between the rubber and each of the parts and preventing separation of the parts, and means electrically connecting the members.

In testimony whereof we affix our signature.

FRED R. DIPPMAN.
EDGAR D. MOORE.